United States Patent [19]
Dahlen et al.

[11] 3,935,592
[45] Jan. 27, 1976

[54] RECORDING INSTRUMENT ADAPTED FOR USE IN REMOTE UNATTENDED LOCATIONS

[75] Inventors: John M. Dahlen, Duxbury; William E. Toth, Bolton; John T. Shillingford, Jr., Watertown; John F. McKenna, Jr., Gloucester, all of Mass.

[73] Assignee: Massachusetts Institute of Technology, Cambridge, Mass.

[22] Filed: Feb. 22, 1974

[21] Appl. No.: 444,948

[52] U.S. Cl. .................... 360/6; 346/33 M; 360/39; 360/51
[51] Int. Cl. ....................... G11b 5/09; G01d 11/24
[58] Field of Search .............. 360/6, 51, 39, 18, 19, 360/20; 346/34, 33 TP, 33 M; 340/5, 172.5

[56] References Cited
UNITED STATES PATENTS

| | | |
|---|---|---|
| 2,756,404 | 7/1956 | Anderson.............................. 340/5 |
| 3,366,924 | 1/1968 | Brown................................... 360/6 |
| 3,461,429 | 8/1969 | Gray ..................................... 360/6 |
| 3,678,468 | 7/1972 | Jefferson........................... 340/172.5 |
| 3,838,445 | 9/1974 | Cupp .................................. 360/18 |

*Primary Examiner*—Raymond F. Cardillo, Jr.
*Assistant Examiner*—Jay P. Lucas
*Attorney, Agent, or Firm*—Arthur A. Smith, Jr.; Robert Shaw; Martin M. Santa

[57] ABSTRACT

A recording instrument for use in ocean depths and like remote locations and adapted to provide meaningful readings of temperatures and pressure, for example, at such locations over a long period of time without attendance. Analog signals from transducers, which indicate the level of the thing-to-be-measured, are processed to give an averaged digital signal that is then stored on a magnetic tape. The system is battery powered. The instrument detailed is for use at ocean depths where the instrument housing and attachment to a mooring line are of particular importance.

7 Claims, 6 Drawing Figures

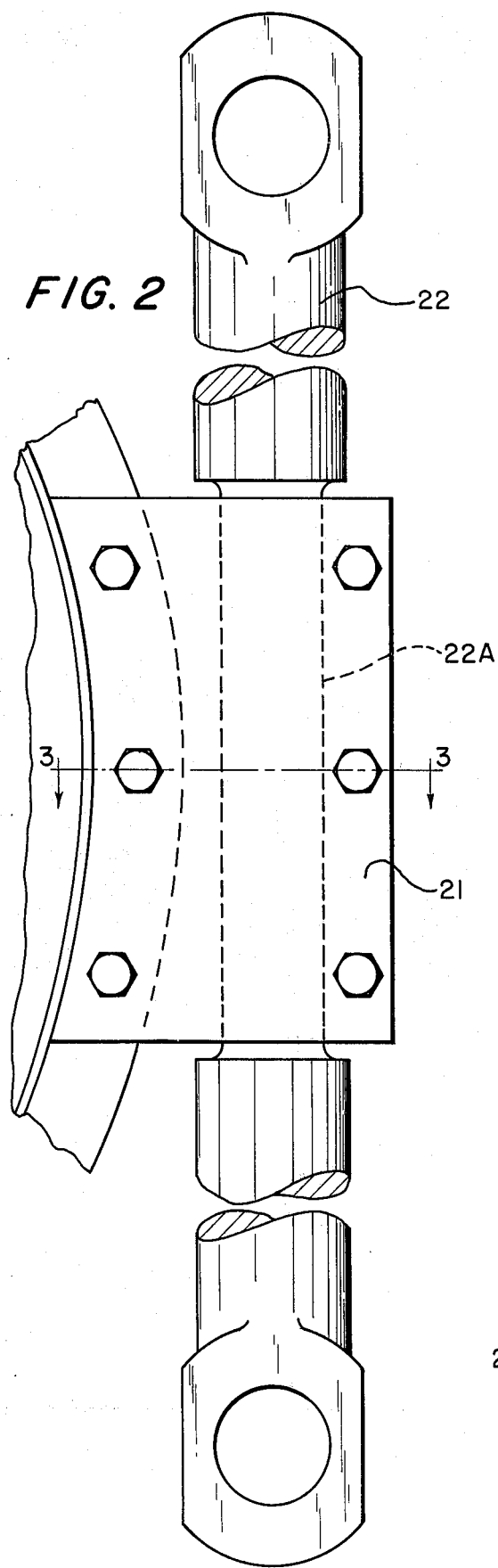
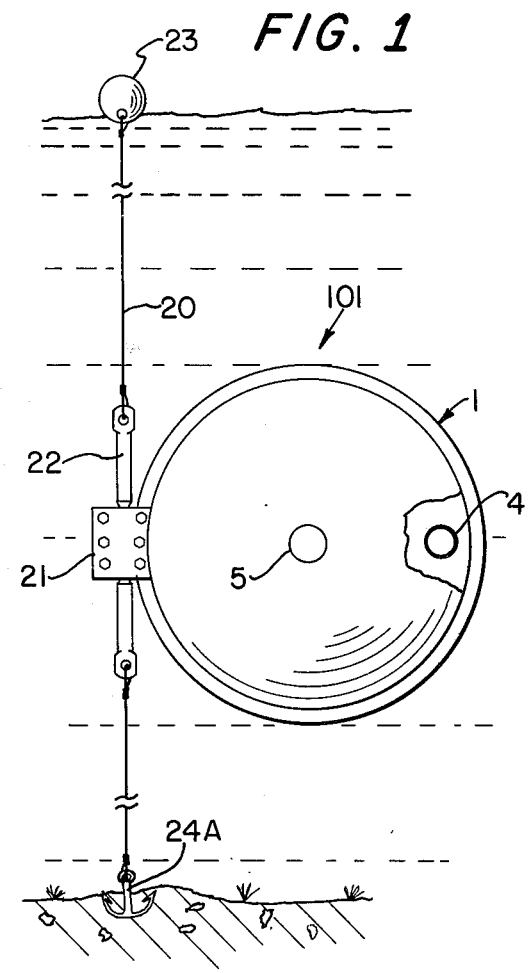
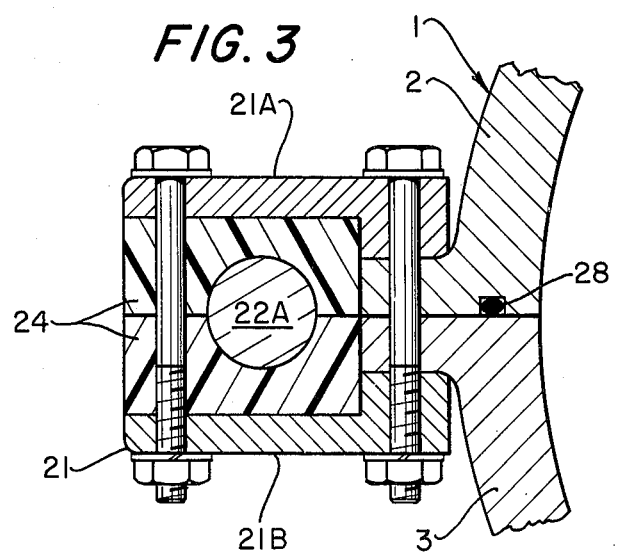

RECORDING INSTRUMENT ADAPTED FOR USE IN REMOTE UNATTENDED LOCATIONS

The invention described herein was made in the course of or under a grant from the National Science Foundation, an agency of the United States Government.

The present invention relates to recording instruments useful for placing at remote locations, for long periods of time and unattended, the instruments being operable to record, accurately, large amounts of data relating to the environment at such locations.

While the instrument herein described has use in locations other than at ocean depths, the work leading to the present invention was done on an instrument adapted for use at the latter locations. The description that follows, is, therefore, directed to an instrument that is useful at such locations. In order to simplify the present specification, there accompanies herewith a report entitled "Temperature/Depth Recorder Data Acquisition Systems" that is hereby incorporated herein by reference and that contains circuit details that are greater than are needed here.

There has been a long existing need for an instrument that can measure temperature at various ocean depths and place these measurements on a permanent record for study. Such instrument must not only resist the inhospitable environment, but it must provide large amounts of accurate data over long periods of time (e.g., a year or more) and without attention. Furthermore, because of possible or unavoidable excursions of the instrument and other factors, it is necessary that pressure measurements be made as well.

Accordingly, it is a principal object of the present invention to provide a recording instrument adapted to operate in remote locations such as, for example, in subsurface ocean locations, for long periods of time, unattended, and yet provide accurate environmental data.

Another object is to provide an instrument that can be placed at ocean depths to provide temperature and pressure data at such depths.

These and still further objects are discussed hereinafter.

The objects of the invention are attained by a temperature and pressure recording instrument adapted to operate in remote locations and the like for long periods of time without attendance that comprises, in combination: transducer means operable to measure at least one of temperature and pressure at the location of the recorder and provide as output an electrical analog signal; an electronic data acquisition system which conditions and converts electrical signals from the transducer means to digital form, said data acquisition system containing electronic means for averaging the data over long periods of time, having low-power-loss dissipation, being adapted to operate over a wide range of input voltages from a battery and containing modular analog signal conditioning to permit flexibility in the types of transducer means with which it will function; a magnetic tape recorder connected to receive the digital signals from the data acquisition system and to store the same; a battery to power the foregoing elements; a housing to receive and protect the foregoing elements; and means for connecting the housing to a mooring line that comprises a swivel clamp which acts to hold the housing to one side of the center line of the mooring line and to isolate the contents of the housing from the damaging effects of vibration that would otherwise occur.

The invention is hereinafter described with reference to the accompanying drawing in which:

FIG. 1 is a side elevation view, partly cutaway, showing a temperature and/or pressure recording instrument of the present invention lodged at an ocean depth by attachment to an anchored mooring line;

FIG. 2 is an expanded view of a part of the instrument of FIG. 1 and is intended to show a preferred means for attachment to the line;

FIG. 3 is an enlarged section view taken upon the line 3—3 in FIG. 2 looking in the direction of the arrows;

Figure 4:
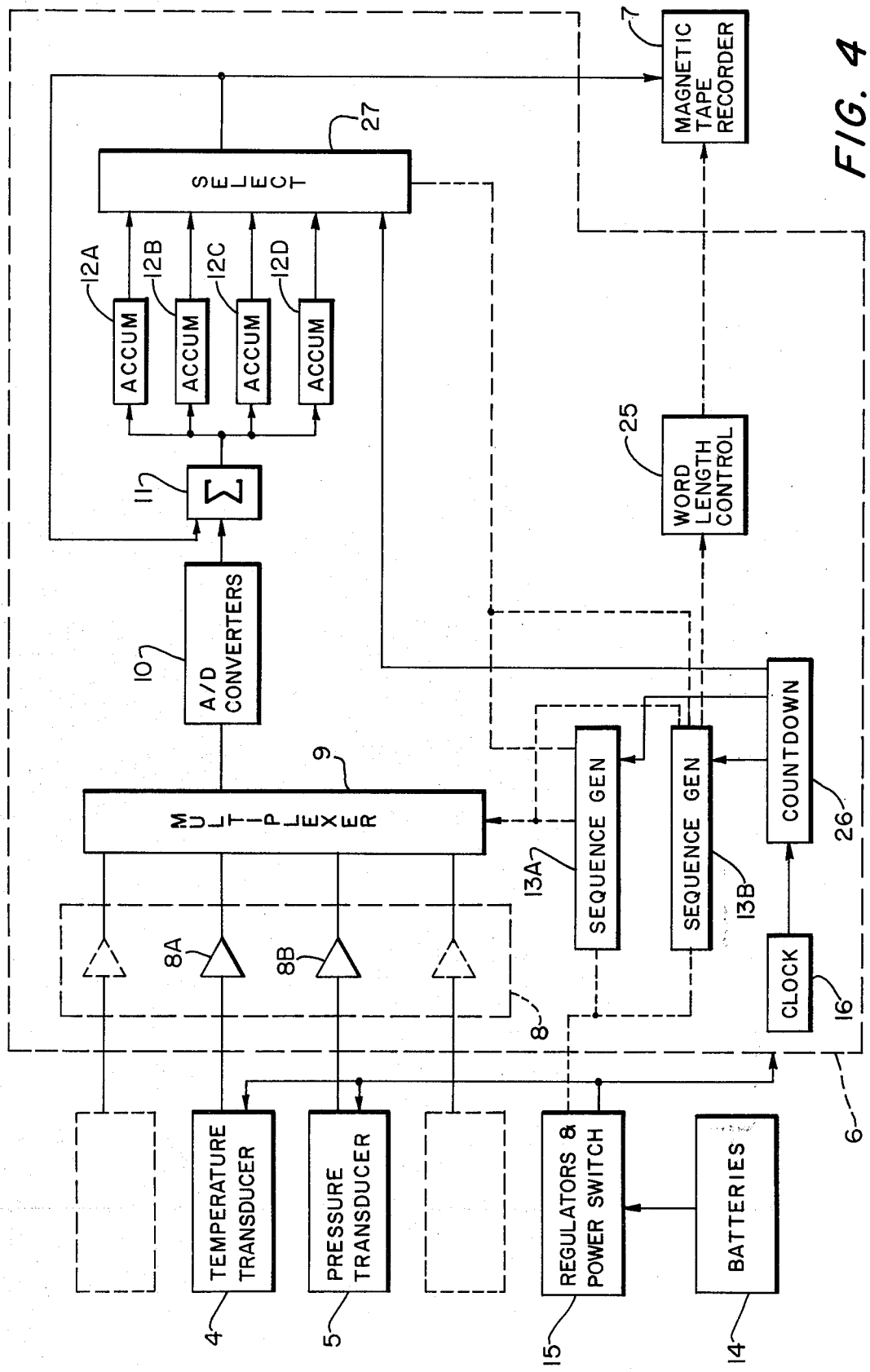
FIG. 4 is a schematic circuit diagram in block diagram form, showing the transducers to measure temperature and pressure and an electrical system to process and store data.

Turning now to FIG. 1, the temperature and pressure recording instrument shown at 101 is adapted to operate in remote locations (e.g., at an ocean depth) and for long periods of time without attendance and to provide over such long period of time meaningful data representing temperature and pressure readings at that location. The instrument 101 comprises a spherical housing 1 consisting of two hemispheres 2 and 3 in FIG. 3, each of which has a flange to permit the hemispheres to be bolted together. The housing 1 contains and protects a temperature transducer 4 and a pressure transducer 5, each of which provides an electric analog signal that is processed by the data acquisition system numbered 6 in FIG. 4. The system 6 and other electronic elements of the instrument discussed in the next few paragraphs are also contained within the spherical housing 1.

Figure 5:
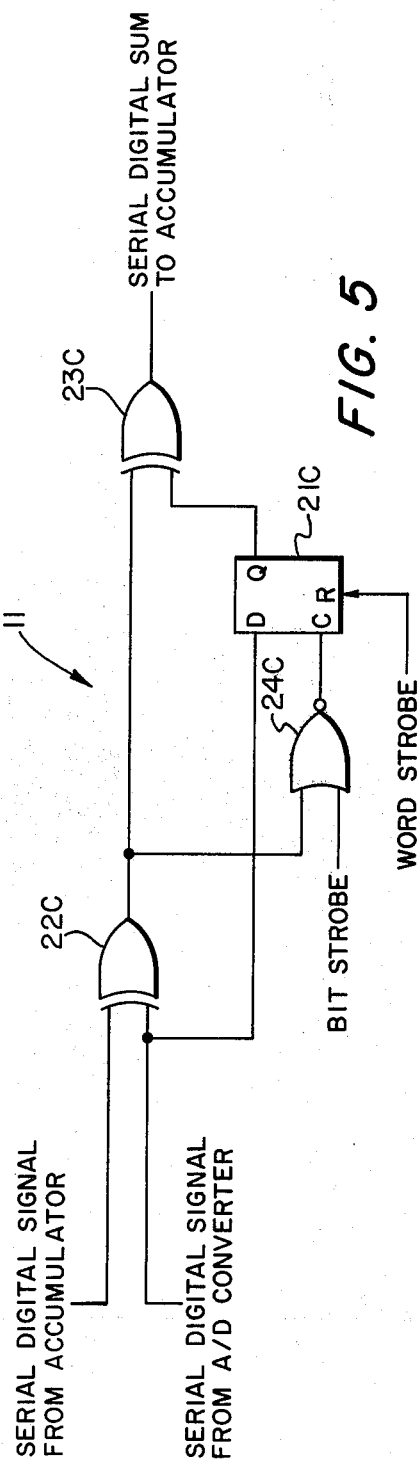
FIG. 5 is a schematic circuit diagram of a digital adder.

The acquisition system 6 conditions and converts the electrical analog signals from the transducers 4 and 5 to digital form for storage in a magnetic tape recorder 7. The conditioning is done by an electronic signal conditioner 8 comprising pre-amplifiers 8A and 8B that act to produce electrical signals suitable for analog-to-digital conversion from the transducer signals. The conditioned signals pass to a multiplexer 9 wherein one signal is selected and further conditioned, and thence transmitted to an analog-to-digital converter 10 where the analog signals are converted to digital form. The multiplexer 9 is provided to select which of the conditioned analog signals is applied to the A/D converter 10. The digital signal thereby formed is passed to a digital adder 11 and thence to one of four accumulators 12A, 12B, 12C and 12D. The foregoing circuit elements are sequenced by two sequence generators 13A and 13B which act independently to cause events to take place at independent frequencies. The digital adder 11 in actual apparatus, as shown in FIG. 5, consists of a flip flop 27C and three gates 22C, 23C, and 24C which act in combination to produce the sum of two digital words.

In order to provide meaningful data, the period of readings must be less than half the shortest period in the signal being monitored. It is not possible to store all the data thereby obtained on the tape of the magnetic tape recorder 7 and still have an instrument that can remain submerged for say a year. On the other hand, if sampling intervals are not small enough, meaningful data is not taken. The accumulators 12A, 12B etc., therefore, act to permit averaging the data over long periods of time as it is the summed data that is passed along to the recorder 7. This averaged data can be recorded much less frequently than would be the case for non-averaged data.

Figure 6:
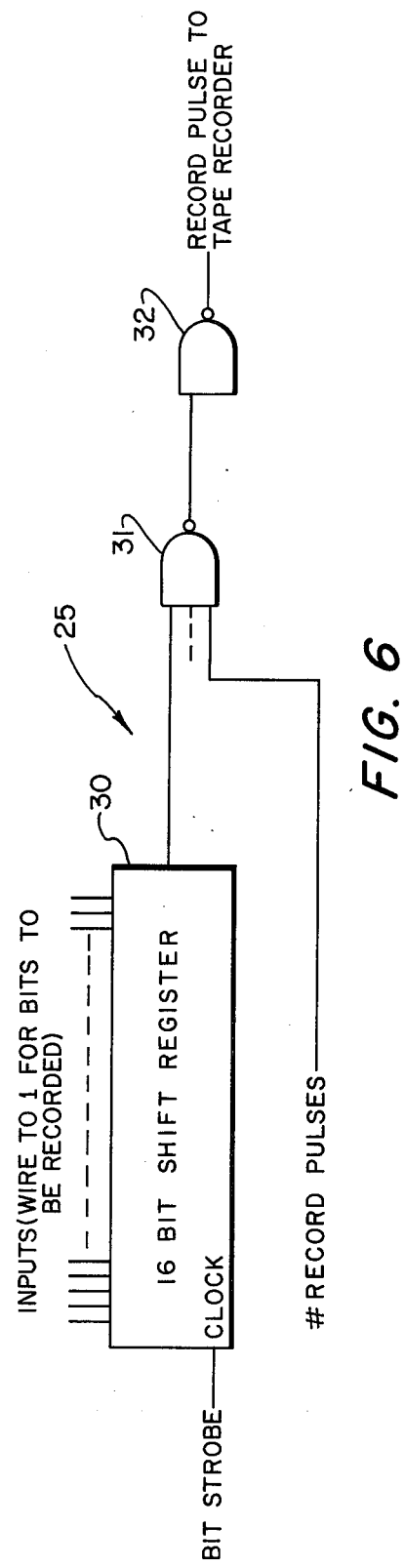
FIG. 6 is a schematic circuit diagram of circuitry adapted to vary word length.

The acquisition system 6 also contains a word length control 25 to alter the word length of the system. This means for altering the word length comprises a shift register 30 in FIG. 6 and NAND gates 31 and 32, the shift register being one whose inputs may be wired in any predetermined fashion to determine said length and thereby allow division of accumulated data by a number that is a power of two, prior to delivering the accumulated data to the magnetic tape recorder. Again, this saves space on the tape and increases the submersion time.

As above noted, the system is sequenced by the sequence generators 13A and 13B. Latching relays are employed so that in the OFF condition negligible power is used in the system. Power to the system is supplied by batteries 14 through a voltage regulator 15. Complimentary metal-oxide-semiconductor (CMOS) logic is used to minimize energy consumption by the logic which is on continuously when the instrument is ON. Regulators which supply energy to the analog circuitry are turned on only when necessary (when a conversion takes place) and a low-dissipation switching-type regulator is used to power the oscillator which must remain on continuously when the instrument is energized. A clock 16 in conjunction with countdown 26 provides timing for the active elements in the instrument 101, to produce a time word to be recorded and to provide timing for initiation of sequences. A digital selection circuit 27 selects the output of one of the four accumulators or the time word for delivery to the tape recorder 7 and the adder 11.

The spherical housing 1 is connected to a mooring line 20 by a swivel clamp 21 which acts to hold the housing to one side of the center line of the mooring line 20, as shown in FIG. 1, thereby to isolate both the mooring line and the contents of the housing from the damaging effects of vibration that would otherwise occur. The line 20 is a galvanized steel or other type line that extends from a buoy 23 to an anchor 24; it connects to the swivel clamp 21 through a steel-bar link 22 which has a reduced-diameter region 22A to receive the clamp. For present purposes the link 22 is considered to be a part of the mooring line 20. The sphere and the members labeled 21A and 21B of the clamp 21 are made of aluminum. To permit the sphere to rotate about the mooring line 20 as an axis and to provide electric isolation between the sphere and the line essentially to eliminate galvanic action therebetween, there is provided a two-part plastic bearing 24. The sphere 1 can thus remain on the downstream side of the line 20 without torsion.

To place the instrument in proper context, the sphere 1 of the actual system is 11½ inches in diameter. With the exception of the transducers, all the above-discussed elements are attached to a central board that is clamped within the two halves of the sphere. The sphere will withstand ocean pressure at any known ocean depth, including the greatest known depth of 36,200 feet. An O-ring 28 in FIG. 3 serves to maintain the watertight integrity of the sphere.

Modifications of the invention herein disclosed will occur to persons skilled in the art and all such modifications are deemed to be within the spirit and scope of the invention as defined by the appended claims.

What is claimed is:

1. A recording instrument for use at remote locations and adapted to provide large amounts of data relating to a condition of the environment at such location, that comprises, in combination: transducer means operable to sense during relatively short intervals a condition of the environment at said location and to produce electrical analog signals representative thereof over relatively long periods of time; an electronic data acquisition system connected to receive the electrical analog signals and to condition the analog signals and convert the same to digital words during data sampling intervals, said data acquisition system containing electronic means for averaging the digital words over said long periods of time to produce output words; a magnetic tape recorder connected to receive the digital output words from the data acquisition system and to store the same during recording intervals; a battery to power the foregoing elements; and a housing to receive and protect the foregoing elements, said means for averaging comprising a serial digital adder providing a sum of consecutive ones of said digital words, a plurality of accumulators which store the sum of said consecutive digital words, and means for dividing the sum of said consecutive digital words by a power of two.

2. An instrument as claimed in claim 1 in which means is provided for altering the output word length of said digital output words.

3. An instrument as claimed in claim 1 that includes two sequence generators which act independently to cause said sampling and recording intervals to occur thereby permitting sampling and recording events to take place at independent frequencies.

4. An instrument as claimed in claim 3 that includes an analog-to-digital converter connected as input to said serial digital adder as well as means for selecting the contents of one of the accumulators for addition to the output of the analog-to-digital converter by the serial digital adder and for delivering to the magnetic tape recorder.

5. Apparatus as claimed in claim 4 that further includes a clock to provide timing for the active elements in the instrument, and to produce a time word to be recorded, and to provide timing for initiation of said events.

6. Apparatus as claimed in claim 5 in which said clock comprises a crystal oscillator and digital countdown circuitry.

7. Apparatus as claimed in claim 5 that further includes means for introducing a time indication on the magnetic tape of the magnetic tape recorder.

* * * * *